United States Patent
Lee et al.

(10) Patent No.: US 8,511,185 B2
(45) Date of Patent: Aug. 20, 2013

(54) SENSOR DEVICE PROTECTED BY A FILM LAYER AND A RESIN LAYER

(75) Inventors: Chung Kook Lee, Daejeon (KR); Young Seong Wang, Daejeon (KR); Cheol Jin Jeong, Buyeo-gun (KR)

(73) Assignee: Lattron Co. Ltd., Daejeon (KR)

( * ) Notice: Subject to any disclaimer, the term of this patent is extended or adjusted under 35 U.S.C. 154(b) by 0 days.

(21) Appl. No.: 13/144,187

(22) PCT Filed: May 11, 2009

(86) PCT No.: PCT/KR2009/002455
§ 371 (c)(1),
(2), (4) Date: Jul. 12, 2011

(87) PCT Pub. No.: WO2010/082712
PCT Pub. Date: Jul. 22, 2010

(65) Prior Publication Data
US 2011/0277570 A1    Nov. 17, 2011

(30) Foreign Application Priority Data
Jan. 13, 2009 (KR) .................... 20-2009-0000366 U

(51) Int. Cl.
*G01D 21/00* (2006.01)
(52) U.S. Cl.
USPC ........................................................ 73/865.5
(58) Field of Classification Search
None
See application file for complete search history.

(56) References Cited

U.S. PATENT DOCUMENTS

| 4,883,366 | A | * | 11/1989 | Dohi et al. | 374/184 |
| 5,367,282 | A | | 11/1994 | Clem | |
| 7,670,884 | B2 | * | 3/2010 | Fujii et al. | 438/149 |
| 2003/0233119 | A1 | * | 12/2003 | Tiedemann | 606/210 |
| 2009/0267899 | A1 | * | 10/2009 | Jeong et al. | 345/166 |

FOREIGN PATENT DOCUMENTS

| EP | 0171877 A1 | | 2/1986 |
| JP | 57-117606 U | | 7/1982 |
| JP | 8-193899 A | | 7/1996 |
| JP | 409171905 | * | 6/1997 |
| KR | 10-0295967 B1 | | 10/2001 |
| KR | 10-0887540 B1 | | 3/2009 |

* cited by examiner

*Primary Examiner* — Robert R Raevis
(74) *Attorney, Agent, or Firm* — Drinker Biddle & Reath LLP

(57) ABSTRACT

A sensor element assembly, including: a sensor element; lead frames provided with the sensor element therebetween, the lead frames fixing the sensor element; a first head protection film protecting the sensor element fixed between the lead frames; an insulating film covering the first head protection film and the lead frames to insulate the lead frames; and a second head protection film (resin layer) further covering the head covered with the insulating film. The sensor element assembly is advantageous in that an epoxy resin layer is formed on a film layer covering a sensor element, so that the strength of the sensor element assembly can be maintained by the epoxy resin layer itself, thereby improving the impact resistance and compressive strength thereof.

2 Claims, 3 Drawing Sheets

SENSOR DEVICE PROTECTED BY A FILM LAYER AND A RESIN LAYER

CROSS-REFERENCE TO RELATED APPLICATIONS

This application is the U.S. national phase of International Patent Application No. PCT/KR2009/002455 filed May 11, 2009, the entire content of which is incorporated herein by reference.

FIELD OF THE INVENTION

The invention relates to a sensor element assembly, in which a head is protected by a film layer and a resin layer.

BACKGROUND

FIG. 1 is a plan view showing a conventional film-type sensor element assembly, and FIG. 2 is a plan view showing a conventional epoxy-type sensor element assembly.

As shown in FIG. 1, the film-type sensor element assembly can be used in narrow spaces because it is configured such that a sensor element 110 and lead frames 120 are formed into a film layer 140 by an insulating film to realize sensing functions.

However, this film-type sensor element assembly is problematic in that its form is not constant because the sensor element 110 is soldered to the thin lead frames.

Further, this film-type sensor element assembly is problematic in that it is extremely weak to external shocks, such as impact resistance, compressive strength and the like, because its structure is unstable due to the insufficient protection of the sensor element 110.

The epoxy-type sensor element assembly, shown in FIG. 2, is advantageous in that the diameter of lead wires 220 can be made small because a sensor element 210 is connected to the lead wires 220 coated with enamel 240 and then only the vicinity of the sensor element 210 is protected by an epoxy resin layer 230 to realize sensing functions.

However, this epoxy-type sensor element assembly is problematic in that, since the upper and lower sides of the sensor element 210 are soldered to the lead wires 220, the size of its head is determined by the diameter of the lead wires 220, so it is difficult to make the head small, and in that, since very thin lead wires must be used in order to make the head thin, its mechanical strength becomes low, so it is difficult to handle it, and its mass productivity is lowered.

Further, this epoxy-type sensor element assembly is problematic in that covered wires are stripped off or cut off by external mechanical shock because lead wires are thin.

SUMMARY

Accordingly, an embodiment of the invention has been devised to solve the above-mentioned problems, and an embodiment of the invention provides a sensor element assembly, which uses lead frames having sufficient mechanical strength as an electrical connector instead of lead wires, which can prevent the lead frames from being damaged by insulating a sensor element and lead frames with a film layer, and which can offer multiple protection of a sensor element because a resin layer for covering a head is formed on a film layer formed on the head.

Another embodiment of the invention provides a sensor element assembly, which can protect a sensor element disposed between lead frames from external impact, and in which each lead frame is flexibly coated with a film layer.

An embodiment of the invention provides a sensor element assembly, including: a sensor element; lead frames provided with the sensor element therebetween, the lead frames fixing the sensor element; a first head protection film protecting the sensor element fixed between the lead frames; an insulating film covering the first head protection film and the lead frames to insulate the lead frames; and a second head protection film further covering the head covered with the insulating film.

Each of the first head protection film and the second head protection film may be formed of silicon or resin, and the insulating film may be formed of a polymer.

Another embodiment of the invention provides a sensor element assembly, including: a sensor element; lead frames provided with the sensor element therebetween, the lead frames fixing the sensor element; an insulating film covering the sensor element fixed between the lead frames; and a resin layer further covering the head covered with the insulating film.

The resin layer may be formed of silicon or resin, and the insulating film may be formed of a polymer.

BRIEF DESCRIPTION OF THE DRAWINGS

The above and other objects, features and advantages of the invention will be more clearly understood from the following detailed description taken in conjunction with the accompanying drawings, in which.

DETAILED DESCRIPTION

Hereinafter, embodiments of the invention will be described in detail with reference to the attached drawings.

Figure 1:
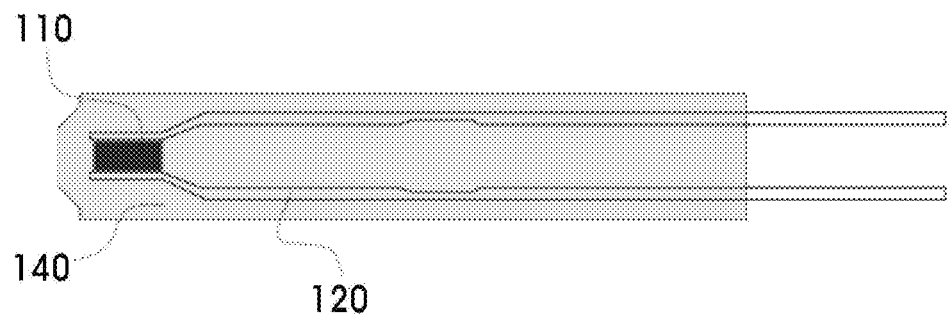
FIG. 1 is a plan view showing a conventional film-type sensor element assembly.
Figure 2:
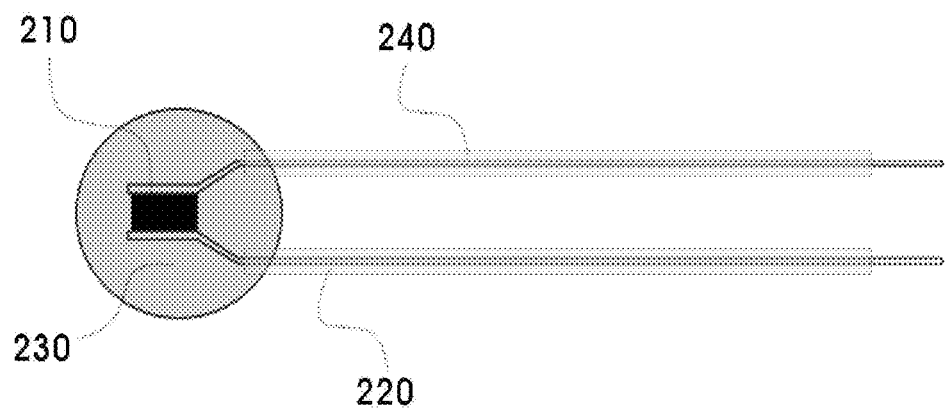
FIG. 2 is a plan view showing a conventional epoxy-type sensor element assembly.
Figure 3:
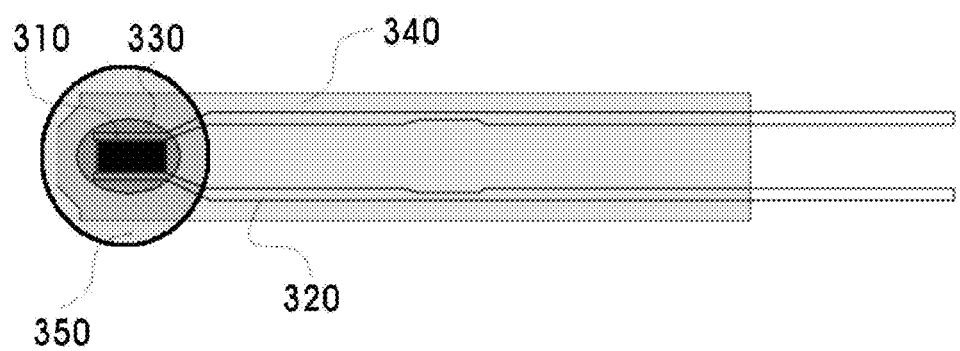
FIG. 3 is a plan view showing a sensor element assembly, in which a sensor element is protected by a film layer and a resin layer, according to a first embodiment of the invention.
Figure 4:
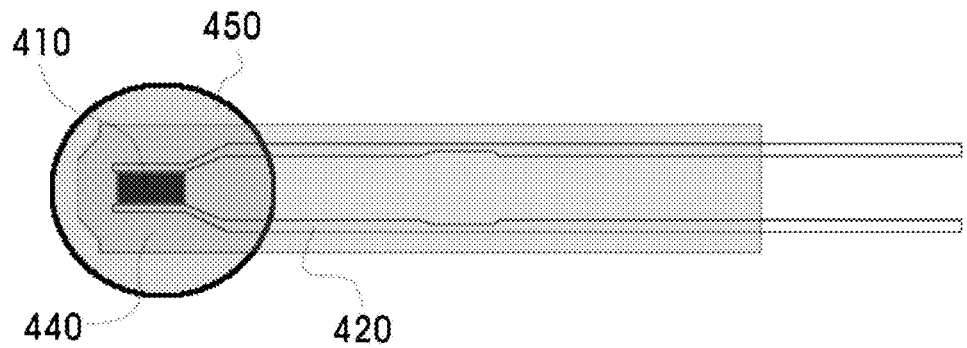
FIG. 4 is a plan view showing a sensor element assembly, in which a sensor element is protected by a film layer and a resin layer, according to a second embodiment of the invention.

FIG. 3 is a plan view showing a sensor element assembly, in which a sensor element is protected by a film layer and a resin layer, according to a first embodiment of the invention, and FIG. 4 is a plan view showing a sensor element assembly, in which a sensor element is protected by a film layer and a resin layer, according to a second embodiment of the invention.

As shown in FIG. 3, the sensor element assembly according to the first embodiment of the invention includes a sensor element 310, lead frames 320, a first head protection film 330, an insulating film 340, and a second head protection film 350.

The sensor element 310 is fixed between the lead frames 320 by interposing the sensor element 310 between the lead frames 320. In this case, the sensor element 310 is fixed between the lead frames 320 by soldering. Hereinafter, the 'sensor element 310' fixed between the lead frames 320 is referred to as 'a head'.

The first head protection film 330 serves to protect the head, that is, the sensor element 310 fixed between the lead frames 320. In this case, the first head protection film 330 is formed of silicon or epoxy. Further, although the first head protection film 330 can be omitted, the impact resistance of the sensor element assembly can be maintained by forming the first head protection film 330.

The insulating film 340 covers the first head protection film 330 and the lead frames 320 to insulate the lead frames 320. In this case, the insulating film 340 is formed of a polymer film, and is referred to as a film layer. Further, since the lead frames 320 and the head are coated with the insulating film 340, it is possible to prevent the lead frames from being damaged, and the sensor element assembly can be configured such that it adheres closely to other elements even in narrow spaces.

The second head protection film 350 covers the head covered with the insulating film 340. In this case, the second head protection film 350 may be formed of silicon or resin, and is referred to as a resin layer. As such, the impact resistance and compressive strength of the sensor element assembly can be improved by forming multiple protection films.

As shown in FIG. 4, the sensor element assembly according to the second embodiment of the invention includes a sensor element 410, lead frames 420, an insulating film 440, and a resin layer 450.

The sensor element 410 is referred to as 'a head'.

The sensor element 410 is fixed between the lead frames 420 by interposing the sensor element 410 between the lead frames 420. In this case, the sensor element 410 is fixed between the lead frames 420 by soldering.

The insulating film 440 covers the sensor element 410 and the lead frames 420 to insulate the lead frames 420. In this case, the insulating film 440 is formed of a polymer film, and is referred to as a film layer.

Further, the insulating film 440 is formed by coating the sensor element 410 and the lead frames 420 with at least one polymer of polyimide, polyester and teflon.

The resin layer 450 covers the head covered with the insulating film 440. In this case, the resin layer 450 may be formed of silicon or epoxy, and is referred to as a resin layer. As such, owing to the formation of the insulating film 440 and the resin layer 450, the impact resistance and compressive strength of the sensor element assembly can be improved.

Figure 5:
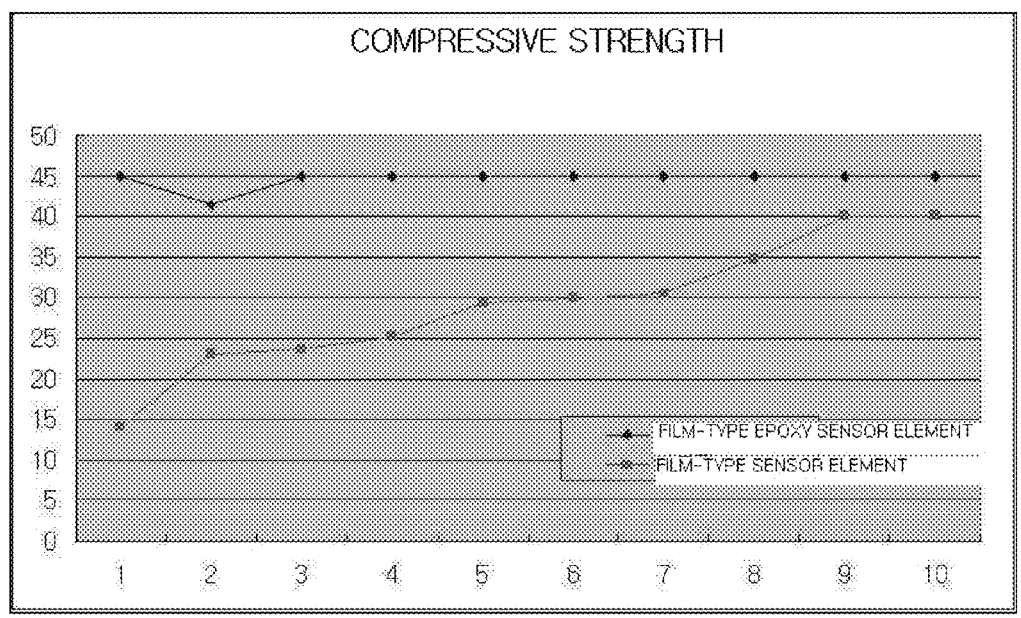
FIG. 5 is a graph showing the compressive strength of the sensor element assembly according to the invention.

FIG. 5 is a graph showing the compressive strength of the sensor element assembly according to an embodiment of the invention.

Specifically, FIG. 5 is a graph showing the compressive strengths of a film-type sensor element and a film-type epoxy sensor element. From FIG. 5, it can be seen that the compressive strengths of ten samples of the film-type sensor element are variously distributed from low values to high values.

In contrast, it can be seen that the compressive strengths of ten samples of the film-type epoxy sensor element are generally at the high values of 45 kg*f, which is an upper limit of the measurement.

Figure 6:
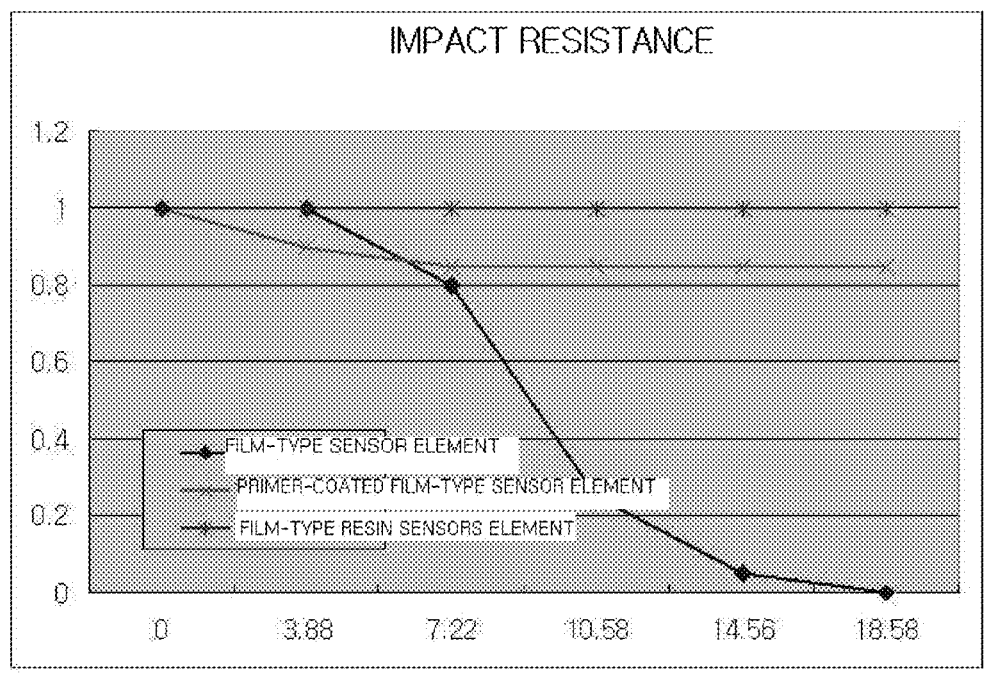
FIG. 6 is a graph showing the impact resistance of the sensor element assembly according to the invention.

FIG. 6 is a graph showing the impact resistance of the sensor element assembly according to an embodiment of the invention.

Specifically, FIG. 6 is a graph showing the impact resistances of a film-type sensor element, a primer-coated film-type sensor element and a film-type resin sensor element, in which the survival rates thereof in stages are measured using twenty or more sensors while changing impact energy. Referring to FIG. 6, it can be seen that the impact resistance of the film-type sensor element is greatly lowered depending on the thickness of a chip, and that the impact resistance of the primer-coated film-type sensor element is lower than 1 although it has been covered with silicon. However, it can be seen that the impact resistance of the film-type resin sensor element is maintained at 1, and thus the film-type resin sensor element is protected by external impact. Here, the value '1' means that the survival rate of the sensor element is 100%.

As described above, the sensor element assembly according to an embodiment of the invention is advantageous in that an epoxy resin layer is formed on a film layer covering a sensor element, so that the strength of the sensor element assembly can be maintained by the epoxy resin layer itself, thereby improving the impact resistance and compressive strength thereof.

Further, the sensor element assembly according to an embodiment of the invention is advantageous in that it is easy to manufacture this sensor element assembly because an epoxy resin layer is further formed after a film layer has been formed.

Further, the sensor element assembly according to an embodiment of the invention is advantageous in that the mechanical strength thereof is stable because its head is thin and its sensor element is slightly influenced by soldering.

Furthermore, the sensor element assembly according to an embodiment of the invention is advantageous in that the mechanical strength and deformation resistance thereof can be improved because lead frames are used instead of lead wires.

Although the various embodiments have been disclosed for illustrative purposes, those skilled in the art will appreciate that various modifications, additions and substitutions are possible, without departing from the scope and spirit of the invention as disclosed in the accompanying claims.

DESCRIPTION OF REFERENCE CHARACTERS 310, 410: sensor element
320, 420: lead frame
330: first head protection film
340 440: insulating film
350: second head protection film
450: resin layer

What is claimed is:
1. A sensor element assembly, comprising:
a sensor element;
lead frames provided with the sensor element therebetween, the lead frames fixing the sensor element;
a first head protection film protecting the sensor element fixed between the lead frames;
an insulating film covering the first head protection film and the lead frames to insulate the lead frames; and
a second head protection film covering the insulating film.
2. The sensor element assembly according to claim 1, wherein the first head protection film is formed of silicon or epoxy and the second head protection film is formed of silicon or resin, and the insulating film is formed of a polymer.

* * * * *